United States Patent [19]

Gardner et al.

[11] Patent Number: 5,216,751
[45] Date of Patent: Jun. 1, 1993

[54] DIGITAL PROCESSING ELEMENT IN AN ARTIFICIAL NEURAL NETWORK

[75] Inventors: Robert M. Gardner, Mesa; William M. Peterson, Scottsdale; Robert H. Leivian, Chandler; Sidney C. Garrison, III, Tempe, all of Ariz.

[73] Assignee: Motorola, Inc., Schaumburg, Ill.

[21] Appl. No.: 898,189

[22] Filed: Jun. 12, 1992

Related U.S. Application Data

[63] Continuation of Ser. No. 600,784, Oct. 22, 1990, abandoned.

[51] Int. Cl.$^5$ .............................................. G06F 15/18
[52] U.S. Cl. ...................................... 395/27; 395/11; 364/728.01
[58] Field of Search .................................. 395/27, 24

[56] References Cited

U.S. PATENT DOCUMENTS

| | | | |
|---|---|---|---|
| 4,193,115 | 3/1980 | Albus | 364/300 |
| 4,941,122 | 7/1990 | Weideman | 364/807 |
| 4,972,363 | 11/1990 | Nguyen et al. | 364/807 |
| 4,994,982 | 2/1991 | Duranton et al. | 364/513 |
| 5,091,864 | 2/1992 | Baji et al. | 395/27 |

OTHER PUBLICATIONS

Fu et al., "A Universal Digital VLSI Design for Neural Networks", IJCNN, Jun. 1989.
Kung et al., "A Unified Systolic Architecture for Artificial Neural Networks", Jour. Parallel and Distr. Computing, 6, 1989, pp. 358-387.
Hamacher et al., Computer Organization, McGraw Hill Book Co., 1984, pp. 288-308.
Treleaven et al., "VLSI Architectures for Neural Networks", IEEE Micro, Dec. 1989, pp. 8-27.
Suzuki et al., "A Study of Regular Architectures for Digital Implementation of Neural Networks", IEEE Symp. on Crkts. and Syst., May 1989, pp. 82-85.

Primary Examiner—Michael R. Fleming
Assistant Examiner—Robert W. Downs
Attorney, Agent, or Firm—Robert D. Atkins

[57] ABSTRACT

An artificial neural network is provided using a digital architecture having feedforward and feedback processors interconnected with a digital computation ring or data bus to handle complex neural feedback arrangements. The feedforward processor receives a sequence of digital input signals and multiplies each by a weight in a predetermined manner and stores the results in an accumulator. The accumulated values may be shifted around the computation ring and read from a tap point thereof, or reprocessed through the feedback processor with predetermined scaling factors and combined with the feedforward outcomes for providing various types neural network feedback computations. Alternately, the feedforward outcomes may be placed sequentially on a data bus for feedback processing through the network. The digital architecture includes a predetermined number of data input terminals for the digital input signal irrespective of the number of synapses per neuron and the number of neurons per neural network, and allows the synapses to share a common multiplier and thereby reduce the physical area of the neural network. A learning circuit may be utilized in the feedforward processor for real-time updating the weights thereof to reflect changes in the environment.

6 Claims, 5 Drawing Sheets

DIGITAL PROCESSING ELEMENT IN AN ARTIFICIAL NEURAL NETWORK

This application is a continuation of prior application Ser. No. 07/600,784 filed Oct. 22, 1990, now abandoned.

CROSS REFERENCE TO RELATED PATENT APPLICATION

This application is related to copending U.S. patent application Ser. No. 07/601,085, "DIGITAL ARCHITECTURE FOR AN ARTIFICIAL NEURAL NETWORK," filed Oct. 22, 1990, by Robert M. Gardner with at least one common inventor and assigned to the same assignee, Motorola, Inc. This application is further related to copending U.S. patent application Ser. No. 07/600,892, "DIGITAL NEURAL NETWORK COMPUTATION RING", filed Oct. 22, 1990, by Robert M. Gardner with at least one common inventor and assigned to the same assignee, Motorola, Inc.

FIELD OF THE INVENTION

This invention relates in general to neural networks and, more specifically, to a digital artificial neural network having feedforward and feedback processing elements connected for intercommunications.

BACKGROUND OF THE INVENTION

A biological neuron may be modeled as a processing element responsive to stimuli through weighted inputs known as synapses. The weighted stimuli are typically summed and processed through a particular non-linearity such as a sigmoid function associated with the neuron. That is, the output signal of the neuron may be represented as a summation of the products of the input signal vector and the synaptic weights processed through the sigmoid function. The output of the neuron is typically coupled to the synapses of other neurons forming an interconnection known as a neural network which possesses many desirable properties including the ability to learn and recognize information patterns in a parallel manner. The neural network may be taught a particular pattern and later be called upon to identify the pattern from a distorted facsimile of the same pattern.

Technologists have long studied the advantageous nature of the biological neuron in an attempt to emulate its behavior electronically. Many neural networks are implemented with analog circuitry wherein a plurality of analog input signals are simultaneously applied to each neuron and multiplied by an equal number of synaptic weights, the result of which is summed and processed through the nonlinear function. Hence for every synapse there is a corresponding input terminal coupled for receiving the analog input signal and a physical multiplier for providing the product of the analog input signal and the synapses. The multipliers are thus physically mapped to an equal number of synapses, the latter of which may be provided by analog memory locations such as the floating gate of an MOS transistor. For example, in a 64-neuron implementation of an analog neural network, the prior art may use a 64-by-80 array of matching synapses and multipliers. Since multipliers and synapses typically require large areas, the physical size of the neuron network grows quickly as the number of neurons increases, even with very large scale integration design techniques. As few as 256 neurons could preclude the use of a single integrated circuit package because of the excessive area required for the synapses and multipliers. Practical neural networks often use thousands of neurons to perform a single useful function and hundreds of thousands for more complex activities. Thus, the conventional analog architecture for neural networks may have imposed an undesirable practical limit on the future growth of the art. A more efficient neural architecture is needed which is not hampered with the redundant nature of the physical mapping common in the analog architecture.

Further consider the large external pin count needed for neural networks processing analog input signals in parallel. The previous example of a 64-neuron integrated circuit package may use 200 or more pins when considering the terminals for power supplies and assorted control signals. The large number of pins is primarily driven by the physical mapping of a multiplier for each synapse, requiring a dedicated input terminal for each synapse and conductor coupled therebetween. As the technology advances and the number of neurons per integrated circuit grows, the external pin count will in all likelihood increase accordingly. Should the number of neurons increase to say 256, the pin count for the integrated circuit package may reach in excess of 300 pins which is unacceptable in most, if not all, conventional integrated circuit packaging technologies. Attempts at time multiplexing the analog input signals have proven very difficult in practice. Hence, analog versions of neural networks generally suffer from limitations imposed upon the number of neurons contained therein by the constraints on physical area of the integrated circuit and external pin count needed to support the potentially vast array of parallel analog input signals in a useful neural network.

Often it is desirable to re-program the synaptic weights and neural interconnection of the artificial neural network to solve a new problem and thereby make more efficient use of the resources. Unfortunately, the aforedescribed analog neural network also tends to be somewhat inflexible in terms of dynamically redefining the weight of the synapses and interconnection of the neural structure, in that the weighting value stored as a charge on the floating gate of an MOS transistor can take several milliseconds to change. The floating gates of the MOS transistors are matched one to each synapse and typically programmed serially, thus, it may take several seconds to adjust all of the weights within the neural network. In electronic terms, several seconds is an extremely long time, too long for use in many voice and pattern recognition applications. Moreover, the physical mapping and hard-wire interconnects of the analog neural network are often predetermined and inflexible, making learning and behavioral modifications difficult. In addition, analog components are generally temperature dependent making such devices difficult to design with high resolution for the synaptic weights and multiplication operations. While analog neural networks are typically very fast, such architectures are constrained in size, flexibility and accuracy thereby developing a need in the art to pursue other architectures, such as a digital approach.

Hence, there is a need for an improved neural network using a digital architecture having a predetermined number of data input terminals irrespective of the number of synapses per neuron, wherein the digital architecture reduces the number of multipliers per neuron for providing more neurons per unit area while allowing the synaptic weights and neural interconnections to be dynamically reassigned to solve other problems thereby providing more efficient use of the available resources.

SUMMARY OF THE INVENTION

Accordingly, an object of the present invention is to provide an improved neural network.

A further object of the present invention is to provide an improved neural network using a digital architecture.

Another object of the present invention is to provide an improved neural network having a configurable feedforward processor wherein the synaptic weights and effective neural interconnections may be dynamically re-assigned for providing efficient use of the resources.

Yet another object of the present invention is to provide an improved neural network having a feedback processor interconnected with a digital computation ring or data bus to handle complex neural feedback arrangements.

Still another object of the present invention is to provide an improved neural network having a predetermined number of data input terminals irrespective of the number of synapses per neuron.

Still another object of the present invention is to provide an improved neural network wherein a plurality of synapses share a common multiplier and thereby reduce the physical area of the neutral network.

In accordance with the above and other objects there is provided an artificial neural network having a digital processing element comprising a first circuit for storing a plurality of digital weighting elements and loading one of the plurality of digital weighting elements onto an output port according to a digital address signal. A second circuit is coupled for receiving a first digital input signal and one of the plurality of digital weighting elements for providing an output signal as the product of the first digital input signal and the one of the plurality of digital weighting elements, while a third circuit is coupled for receiving the output signal of the second circuit and accumulating the value thereof. A fourth circuit is responsive to the plurality of digital weighting elements and second and third digital input signals for altering the values of the plurality of digital weighting elements stored in the first circuit.

In another aspect the present invention comprises a plurality of digital processing elements, wherein one of the plurality of digital processing elements includes a first circuit for storing a plurality of digital weighting elements and loading one of the plurality of digital weighting elements onto an output port according to a digital address signal. A second circuit is coupled for receiving a first digital input signal and one of the plurality of digital weighting elements for providing an output signal as the product of the first digital input signal and the one of the plurality of digital weighting elements, while a third circuit is coupled for receiving the output signal of the second circuit and accumulating the value thereof. A fourth circuit is responsive to the output signal of the third circuit and the output signals of ones of the plurality of digital processing elements for accumulating the values thereof and providing the output signal of the one of the plurality of processing element.

DETAILED DESCRIPTION OF THE PREFERRED EMBODIMENT

Figure 1:
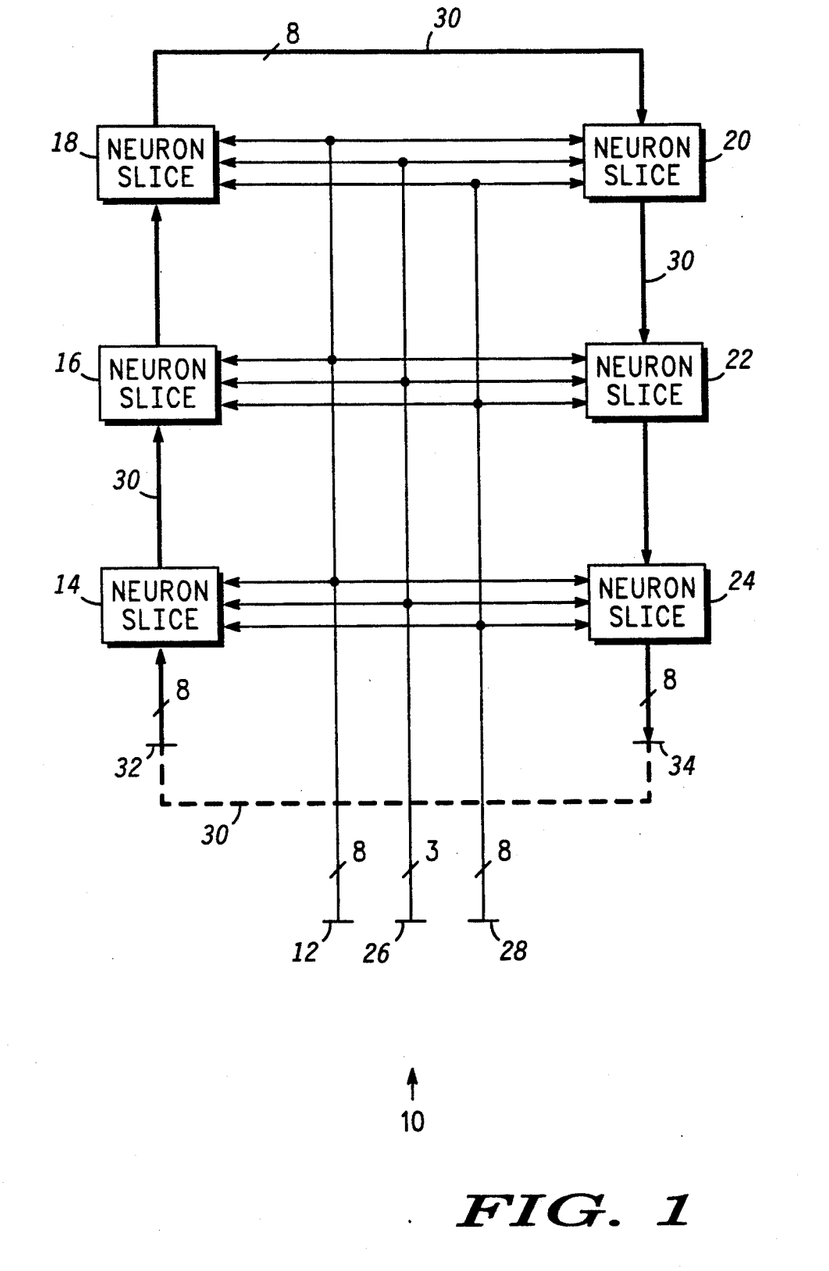
FIG. 1 is a block diagram illustrating a digital architecture including a plurality of neuron slices operating as the preferred embodiment of the present invention.

Referring to FIG. 1, there is shown artificial neural network 10 suitable for manufacturing in integrated circuit form using conventional integrated circuit CMOS processes. An 8-bit digital input signal is applied at input bus 12 and routed to the first data inputs of neuron slices 14, 16, 18, 20, 22 and 24. In addition, a 3-bit address word is applied at the address inputs of neuron slices 14–24 via address bus 26, while an 8-bit digital scale factor is applied at input bus 28 to the second data inputs of the same. Neuron slices 14–24 are interconnected by 8-bit computation ring 30 as shown from terminal 32, through neuron slices 14, 16 and 18 and looping around through neuron slices 20, 22 and 24. Terminal 34 of computation ring 30 may be connected to terminal 32 thereby completing the loop. In one embodiment, computation ring 30 comprises a plurality of electrically isolated sections; each section having eight conductors coupling adjacent pairs of neuron slices 14–24. For example, the first section of computation ring 30 is coupled between neuron slices 24 and 14, and the second section is coupled between neuron slices 22 and 24, and so on through the sixth section which is coupled between neuron slices 16 and 14. Thus, each section of computation ring 30 may and typically does contain unique data. Alternately, the interconnection of neuron slices 14–24 may comprise a contiguous data bus coupled thereto through respective bus interface circuits as will be shown.

The architecture of neural network 10 allows the number of neuron slices serially coupled between terminals 32 and 34 to be readily increased for a particular application. Each additional neuron slice would be serially coupled in computation ring 30 similar to neuron slices 14–24 and further coupled for receiving the first digital input signal and the digital scale factor from input buses 12 and 28, respectively, and the address word via address bus 26. For the case of a single data bus, the supplemental neurons would connect thereto via bus interface circuits. Moreover since neural network 10 may be manufactured as a monolithic integrated circuit chip, terminal 34 may connected to the terminal like 32 of a second digital neural network integrated circuit, and the terminal like 34 of the second digital neural network integrated circuit would connect back to terminal 32 of neural network 10, thereby expanding the number of neuron slices and the length of computation ring 30 to include two integrated circuits. Indeed, practically any number of neuron slices may be coupled to computation ring 30 although certain feedback configurations may slow down the overall throughput, further discussion on this feature is forthcoming. Thus, the length of computation ring 30 and the number of neuron slices like 14-24 may increase for a particular application and is generally not limited by the digital architecture described herein. In practice, neural network 10 may contain thousands of neuron slices disposed on a monolithic integrated circuit for performing useful computations, possibly in combination with other similar digital neural network integrated circuits.

Figure 2:
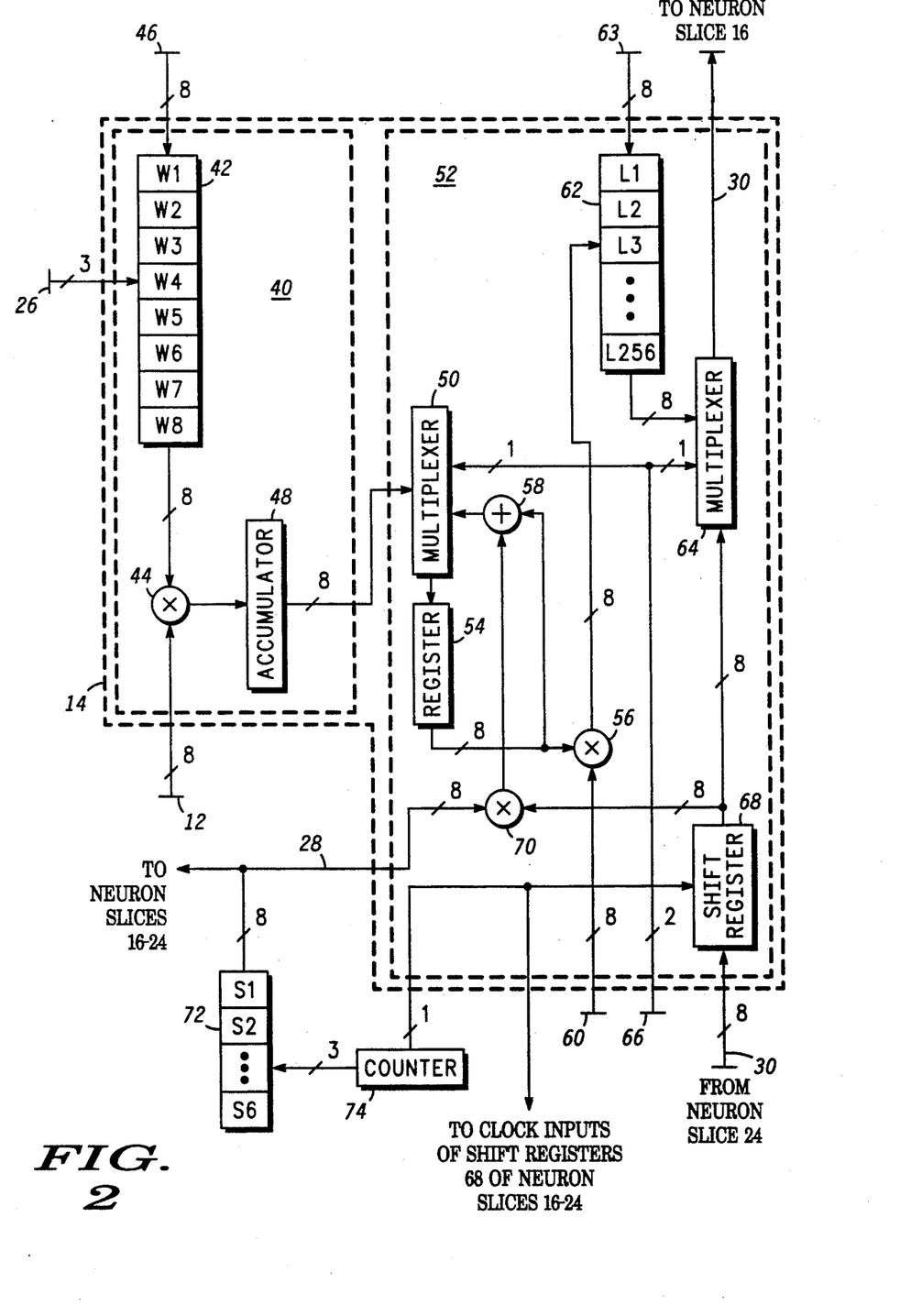
FIG. 2 is a simplified block diagram illustrating a preferred embodiment of a neuron slice with feedforward and feedback processors.

Further detail of neuron slice 14 is shown in FIG. 2 with feedforward processor 40 including weight memory 42 coupled for receiving the 3-bit address word $A_i$ applied at address bus 26 and providing an 8-bit digital weight value $W_i$ at the first input of twos complement, four quadrant-type multiplier 44 in response to the address word $A_i$, where i ranges from 1 to 8. Weight memory 42 includes a predetermined number of 8-bit memory locations, $W_1$-$W_8$, and may be implemented as RAM, ROM, EPROM, EEPROM or any other suitable digital memory device. Weights $W_i$ are written into weight memory 42 in a conventional manner through input bus 46. The second input of multiplier 44 is coupled for receiving the first digital input signal $I_i$ applied at input bus 12, whereby the product of the digital input signal $I_i$ and the digital weight $W_i$ from one location of weight memory 42 is provided at the input of accumulator 48 and summed with the prior contents thereof. The width of multiplier 44 and accumulator 48 are typically each made 16 bits allowing the latter to accumulate several values without overflowing. Once the eight products of $I_i \times W_i$ are accumulated, the output signal of accumulator 48 may be taken as the upper eight most significant bits of its output register and applied at the first input of multiplexer 50 of feedback processor 52. It is known that weight memory 42 can be divided into several logical areas allowing multiple sets of weights $W_i$ to be stored concurrently and accessed as needed with different input signal series $I_i$. This allows physical neurons (excluding weight memory 42) to operate on several possibly distinct neural applications in a time multiplexed fashion thereby increasing the operational speed of neural network 10 by avoiding excessive swapping of weight $W_i$ sets. This is especially attractive since in typical implementations pure memory is very dense.

The output signal of multiplexer 50 is stored in register 54 for application to the first input of multiplier 56 and to the first input of summer 58. The second input of multiplier 56 is coupled for receiving a digital gain factor by way of input bus 60. The output signal of multiplier 56 is applied at the address input of lookup table 62, the latter of which comprises a predetermined number of 8-bit memory locations, $L_1$-$L_{256}$, and may also be implemented as RAM, ROM, EPROM, EEPROM or any other suitable digital memory device. Values $L_i$ are written into lookup table 56 in a conventional manner through input bus 63. The values stored in locations $L_1$-$L_{256}$ of lookup table 62 are typically assigned as a non-linear sigmoid function corresponding to address values "00000000" to "11111111" from multiplier 58. For example, memory locations $L_1$-$L_{30}$ may each contain the value "00000000" followed by a sloping linear approximation for locations $L_{31}$-$L_{226}$ ranging from "00000001" to "11111110". The value "11111111" is stored in locations $L_{227}$-$L_{256}$ completing the sigmoid function. The addressed value from lookup table 62 is applied at the first input of multiplexer 64, while the output of multiplexer 64 is coupled through the sixth electrically isolated section of computation ring 30 to neuron slice 16. The aforedescribed elements substantially describe the complete feedforward path of neuron slice 14.

For feedback operations, neuron slice 24 is coupled via the first section of computation ring 30 to the input of shift register 68, and the output of shift register 68 is coupled to the first input of multiplier 70, while the second input of the latter is coupled for receiving the digital scaling factor from input bus 28. The scaling factors $S_1$-$S_6$ are centrally stored off-site from neuron 14 in memory 72 operating under control of counter 74 coupled to the address input thereof allowing the contents of memory 72 to be systematically applied at input bus 28 as counter 74 repeatedly cycles through a predetermined range of values. Moreover, counter 74 provides a clock signal for shift register 68 at each change in value thereof such that predetermined digital scaling factors from memory 72 are synchronized with the operation of shift register 68 for providing the desired operands at the first and second inputs of multiplier 70. The output signal of multiplier 70 is applied at the second input of adder 58, the output of which is coupled to the second input of multiplexer 50. It is understood that multipliers 56 and 70 may be implemented as multiplexers receiving control signals as integer powers of two from input buses 28 and 60, respectively. Multiplexer 50 is responsive to a first control signal applied at control bus 66 for switching the input thereof to read from accumulator 48 at the occurrence of a first state of the first control signal and from the output of adder 58 at the occurrence of a second state of the first control signal, while multiplexer 64 is responsive to a second control signal from control bus 66 for switching the input thereof to read from the output of lookup table 62 at the occurrence of a first state of the second control signal and from the output of shift register 68 at the occurrence of a second state of the second control signal. Neuron slices 16-24 follow a similar construction as described for neuron slice 14, that is, each neuron slice comprises the same aforedescribed elements such as weight memory 42, multiplier 44, accumulator 48, multiplexer 50, lookup table 62, multiplexer 64, shift register 68, etc.

The features of neuron slices 14-24 allow easy configuration for several useful neural network operations. One such operation is the strict feedforward type neural computation without feedback where the digital input signal $I_i$ from input bus 12 is involved in the computation. For the strict feedforward process, feedback processor 52 is partially disabled, that part being the feedback computation elements including multiplier 70 and adder 58. Other more complex feedback configurations will be discussed later, but first consider the present example wherein weight memory 42 is pre-loaded via input bus 46 with the desired weights calculated possibly from an external neural network computer simulation. For the present example, the desired neural computation is the dot product combination of the digital input signal series $I_1$-$I_8$ with weights $W_1$-$W_8$ yielding a 16-bit value $V_{48}$ in accumulator 48 as follows:

$$V_{48} = I_1 \times W_1 + I_2 \times W_2 + I_3 \times W_3 + I_4 \times W_4 + I_5 \times W_5 + I_6 \times W_6 + I_7 \times W_7 + I_8 \times W_8 \qquad (1).$$

For one computation series according to equation (1), accumulator 48 is zeroed after which a first 8-bit digital input signal, $I_1$, is applied at the second input of multiplier 44 via input bus 12, while an address word, $A_1$, is applied at the address input of weight memory 42 by way of address bus 26. The value of address word $A_1$ retrieves the 8-bit weight $W_1$ from weight memory 42 and applies the same to the first input of multiplier 44. The product of digital input signal $I_1$ and weight $W_1$ is placed in accumulator 48. A second digital input signal, $I_2$, is then applied at the second input of multiplier 44 as a second address word, $A_2$, retrieves weight $W_2$ and applies the 8-bit value thereof to the first input of multiplier 44. The result of the second multiplication of digital input signal $I_2$ and weight $W_2$ is summed with the prior contents ($I_1 \times W_1$) of accumulator 48. The process continues for third, fourth, fifth, sixth, seventh and eighth combination of digital input signals $I_3$-$I_8$ and weights $W_3$-$W_8$ according to equation (1) leaving the 16-bit value $V_{48}$ in accumulator 48.

The width of accumulator 48 is typically made large, say 16-bits, allowing the accumulation to continue without overflow for the anticipated length of the computation series of equation (1). However, provided the contents of accumulator 48 simply saturate without rolling over, an overflow condition is generally not a problem even though some data may be lost since most sigmoid-type functions tend to converge to an upper or lower limit. The output signal of accumulator 48 available at the completion of the first computation series according to equation (1) is the eight most significant bits of the overall 16-bit accumulation. The first control signal is set to the first state whereby the output signal of accumulator 48 is routed through multiplexer 50 and stored in register 54.

Continuing with the strict feedforward example, the eight most significant bits of accumulator 48 as stored in register 54 are scaled through multiplier 56 to generate an address word for lookup table 62. Multiplier 56 is optional and provides a gain factor from the digital signal applied at input bus 60 for the output signal of register 54. It is well understood in the art how to use a digital signal to increase or decrease the value of an operand. If the contents of lookup table 62 provided say a non-linear sigmoid function, the gain factor provided by multiplier 56 would alter the slope of the sigmoid function. The output signal value of multiplier 56 is thus a scalable address into lookup table 62 for providing an output value according to the non-linear function associated therewith. Other examples of functions for lookup table 62 include a step response, ramp and piece-wise linear model. The second digital control signal is set to its first state whereby the contents of the addressed location in lookup table 62 applied at the first input of multiplexer 64 becomes an 8-bit digital signal (feedforward outcome) available on the sixth section of computation ring 30 at the input of shift register 68 of neuron slice 16.

While neuron slice 14 is performing the aforedescribed calculations, neuron slices 16-24 are simultaneously performing computations like equation (1) on the same digital input signal sequence $I_1$-$I_8$ albeit using different weights according to the pre-stored values of weight memories like 42. The result of each computation series is routed through each multiplexer like 64 of neuron slices 14-24, thus, there are six unique 8-bit digital signals (feedforward outcomes $F_1$-$F_6$) stored around computation ring 30 in shift registers like 68 and available at the first through the sixth sections thereof. For reference, feedforward outcome $F_1$ is passed through multiplexer 64 of neuron slice 24 and made available on the first section of computation ring 30 at the input of shift register 68 of neuron slice 14, as multiplexers like 64 of neuron slices 22, 20, 18, 16 and 14 transfer feedforward outcomes $F_2$, $F_3$, $F_4$, $F_5$ and $F_6$, respectively, onto the second, third, fourth, fifth and sixth sections of computation ring 30. The 8-bit feedforward outcome $F_1$ may be read from computation ring 30 at a predetermined tap point, say terminal 34, for further processing by an external controller such as a microprocessor (not shown). Upon command from the external microprocessor, counter 74 is incremented thereby clocking each shift register 68 of neuron slices 14-24 and shifting the 8-bit feedforward outcome of each neuron slice one position along computation ring 30 into shift register 68 of the next neuron slice. For example, feedforward outcome $F_6$ of neuron slice 14 transfers into shift register 68 of neuron slice 16 while feedforward outcome $F_5$ of neuron slice 16 rotates into shift register 68 of neuron slice 18, and so on around the loop. Feedforward outcome $F_2$ originating in neuron slice 22 may be read from terminal 34 at the output of multiplexer 64 of neuron slice 24 following the first shift. Multiplexers 64 of neuron slices 14-24 are now switched by the second control signal applied at control bus 66 to read from the output of shift register 68 instead of lookup table 62. A second shift around computation ring 30 by counter 74 moves feedforward outcomes $F_3$-$F_6$ into shift register 68 of neuron slices 24, 22, 20 and 18, respectively, allowing feedforward outcome $F_3$ to be read from terminal 34. The rotation around computation ring 30 continues with clocks from counter 74 until feedforward outcomes $F_4$, $F_5$ and $F_6$ are read from terminal 34. This completes one strict feedforward computation series using the dot product combination of digital input signals $I_1$-$I_8$ and weights $W_1$-$W_8$ through feedforward processor 40.

For efficient use of resources, feedforward processor 40 and feedback processor 52 including computation ring 30 may be operated concurrently, even with different clock sources whereby feedforward processor 40 may be working on the dot product combination of one computation series digital input signals $I_1$-$I_8$ and weights $W_1$-$W_8$ and storing the results in accumulator 48, while feedback processor 52 shifts the previous computation series around computation ring 30 and out through terminal 34. Thus, feedback processor 52 is continually operating at least one series of digital input signals $I_1$-$I_8$ behind feedforward processor 40 thereby at least doubling the overall throughput assuming equal computational delays through each.

It should be appreciated by now that the interaction of weight memory 42, multiplier 44 and accumulator 48 behaves as an artificial neuron having a plurality of synapses less the non-linear sigmoid. Since the number of memory locations in weight memory 42 and the length of the digital input signal series $I_i$ are arbitrary, feedforward processor 40 may provide the function of a neuron having practically any number of synapses. Further notice that each neuron slice is coupled to a common input bus 12. Thus, the digital architecture of neural network 10 includes a predetermined number of data input terminals, for example eight conductors for input bus 12, irrespective of the number of synapses in a neuron or the number of neurons in the network. This substantially reduces the external pin count in a integrated circuit implementation. Furthermore, feedforward processor 40 uses only a single multiplier 44 for combining digital input signals $I_i$ and weights $W_i$, independent of the number of storage locations in weight memory 42. This feature reduces the physical size of one neuron allowing more neurons and more useful computations per integrated circuit. Although the digital implementation of the present invention may operate slower than a completely parallel analog architecture, its speed is still adequate for neural network applications.

Figure 3:
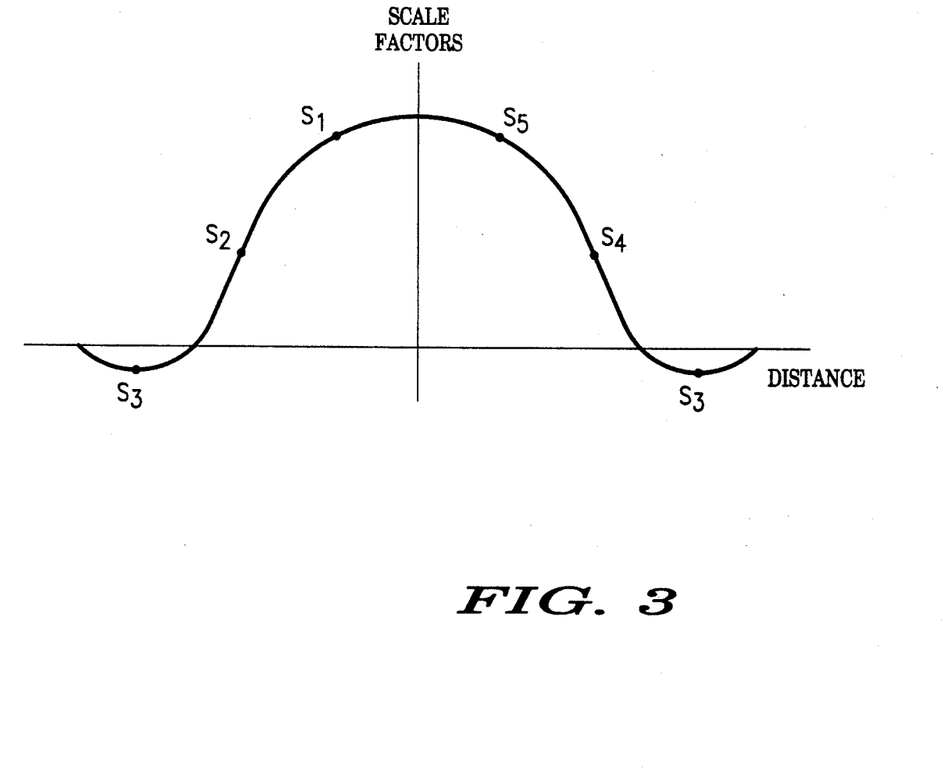
FIG. 3 is a graph of the scale factor distribution for the feedback processor.

Now consider a more complex neural network configuration where the final outcome relies on both feedforward outcomes $F_1$-$F_6$ of the present computation series and the feedforward outcomes of the previous computation series as modified by predetermined scaling factors $S_1$-$S_6$. One example of such of neuron network is the well known Kohonen feature map where the output signal of each neuron is fed back as an input signal to one or more synapses of the same and other neurons of the two dimensional feature map. After this process repeats some number of times, a bubble of activity forms around the neuron(s) winning the competition of the input signal vector, that is, providing the highest output signal level given the weights and input signal applied thereto. For example, take a reference neuron, say in the center of the feature map, and consider the weighting distribution of the synapses of other neuron slices on computation ring 30 which are coupled for receiving its output signal. The feedback synapses of the close neighboring neurons are generally weighted more heavily than the synapses of those neurons farther away from the reference neuron. This develops a region of activity often referred to as a bubble around the neuron(s) experiencing the strongest reaction of the given input signal vector. One such distribution of weights versus distance from the reference neuron is commonly referred to in the literature as the "Mexican hat" distribution by nature of its shape, as illustrated in FIG. 3, since the synapses for the close neighboring neurons are weighted high to favor the same input signal vector as the reference neuron at the center of the Mexican hat. The feedback synapses decrease with increasing distance in each direction from the reference neuron and eventually become negative thereby disfavoring the input signal. The synapses for the neurons on the outer edges of the feature map typically converge to zero weight corresponding to "the brim of the Mexican hat" and provide a neutral reaction to the output signal fed back from the reference neuron. This is known to be equivalent to a convolution of the neuron activities with the "Mexican hat" function providing a result as a "contrast enhancement" of the original activities of the neurons. The weighting distribution may also follow other types of Y-axis symmetric functions.

Feedback processor 52 may be configured and operated to perform such a weighting distribution of the feedforward outcomes as shown in FIG. 3. A first computation series is processed through feedforward processor 40 and placed in register 54 of neuron slice 14 similar to the description of the strict feedforward example. The output signal of register 54 is processed through gain multiplier 56 forming an address into lookup table 62 to identify a data point in the sigmoid function. The addressed contents of lookup table 62 of neuron slice 14 (feedforward outcome $F_6$) are placed on the sixth section of computation ring 30 at the output of multiplexer 64 of neuron slice 14. Likewise, feedforward outcomes $F_1$-$F_5$ from the dot product computation series are available at the output of multiplexers 64 of neuron slices 24, 22, 20, 18 and 16, respectively.

Counter 74 is set to the address location of scale factor $S_1$ in memory 72 and further provides a clock signal simultaneously for each shift register 68 thereby rotating computation ring 30 one position such that feedforward outcomes $F_1$-$F_6$ now reside in shift registers like 68 of neuron slices 14, 24, 22, 20, 18 and 16, respectively. Multiplexers like 64 of neuron slices 14-24 are switched by the second control signal applied at control bus 66 to read from the output of shift register 68 instead of lookup table 62. Neuron slices 16 and 24 are considered to be in the close neighborhood of neuron slice 14 as shown in FIG. 1, hence, a relatively large scale factor $S_1$ (as compared to $S_2$ and $S_3$) is applied at input bus 28 from memory 72. Feedforward outcome $F_1$ in shift register 68 of neuron slice 14 is applied at the first input of multiplier 70 and weighted therein by the digital scale factor $S_1$ from input bus 28. The output signal of multiplier 70 is added with the contents of register 54 by adder 58 and stored back into register 54 via multiplexer 50 overwriting the previous contents.

At the same time, neuron slice 16 is making a similar computation only on feedforward outcome $F_6$ which was placed its shift register 68 at the first shift of computation ring 30. Neuron slices 14 and 18 are close neighbors for neuron slice 16, thus the same large scale factor applied at input bus 28 is still appropriate. The product of the digital scale factor times feedforward outcome $F_6$ from shift register 68 of neuron slice 16 is added with the contents of its register 54 and loaded back into the same. Likewise, neuron slices 24, 22, 20 and 18 are performing feedback computations by scaling feedforward outcomes $F_2$-$F_5$, respectively, and adding the result with the contents of registers like 54. Thus, neuron slices 14-24 are processing a close neighbor's feedforward outcome (a distance of one away) through feedback processor like 52.

Counter 74 is incremented to the address location of scale factor $S_2$ in memory 72 thereby generating another clock signal for shift registers like 68 and rotating computation ring 30 one more position such that feedforward outcomes $F_1$-$F_6$ move into shift registers 68 of neuron slices 16, 14, 24, 22, 20 and 18, respectively. For this second shift, each feedback processor 52 is operating on a feedforward outcome originating from a neuron slice of distance two away and thus not an immediate neighbor. Therefore, digital scale factor $S_2$ applied at input bus 28 is much less than scale factor $S_1$, much as the aforedescribed "Mexican hat" distribution falls as the neurons receiving the feedback signal are removed from the vicinity of the reference neuron. With a smaller scale factor $S_2$, feedforward outcome $F_2$ in shift register 68 of neuron slice 14 contributes less to the contents of register 54 via adder 58 although the result is still stored back in the same.

Neuron slice 16 is making a similar computation on feedforward outcome $F_1$ as placed its shift register 68 at the second shift of computation ring 30. Neuron slice 24 being the originator of feedforward outcome $F_1$ is not a direct neighbor of neuron slice 16, thus the reduced scale factor applied at input bus 28 is used. The product of the digital scale factor times feedforward outcome $F_1$ from shift register 68 of neuron slice 16 is added with the contents of register 54 and loaded back into register 54 through multiplexer 50. Likewise, neuron slices 24, 22, 20 and 18 are performing feedback computations by scaling feedforward outcomes $F_3$-$F_6$, respectively, and adding the result with the contents of registers like 54. Thus, the feedback processors like 52 of neuron slices 14–24 are processing the feedforward outcomes originating from a neuron slice of distance two away.

The process continues until counter 74 has addressed scale factors S₃–S₆ and feedforward outcomes F₁–F₆ have shifted completely around computation ring 30 each contributing a portion thereof to the contents of registers 54 commensurate with the proximity of the origination of the feedforward outcomes to the processing neuron. This completes one rotation of computation ring 30 after which the contents of registers 54 of neuron slices 14–24 each again address lookup tables 62 and transfer the addressed value thereof through multiplexers 64, setting the stage for another rotation, if desired, beginning with scale factor $S_1$. It is common to repeat the rotation of computation ring 30 say five times allowing the contents of multiplexers 50 of neuron slices 14–24 to settle to a final value. The contents of registers 54 of neuron slices 14–24 address lookup tables 62 one more time and transfer the addressed value thereof through multiplexers 64 for removal from computation ring 30 in the aforedescribed manner. The number of complete rotations should be kept to a minimum as the extra processing slows the throughput of neural network 10.

The correct relationship of "closeness" can also be maintained throughout computation ring 30 if the neurons are arranged in a N×M torus and correctly identified with the physical neurons. This is important in order to model a two-dimensional feature map such as that discussed in Kohonen's publications.

The following table provides an example of the scaling factors $S_1$–$S_6$ relative to neuron slice 14 versus distance away for neuron slices 14–24, see FIG. 3. For example, neuron slices 16 and 24 are distance one away from neuron slice 14, while neuron slices 18 and 22 are a distance of two away, and neuron slice 20 is a distance of three away from neuron slice 14. The values for scaling factors $S_1$–$S_6$ are chosen in a manner similar to digital filter coefficients so that proper convergence properties are maintained. The following values represent twos-complement notation for scale factors $S_1$–$S_6$.

TABLE 1

| Scale Factor Weighting Distribution versus Distance | | |
|---|---|---|
| SCALE FACTOR | VALUE | DISTANCE AWAY |
| $S_1$ | "01011111" | 1 |
| $S_2$ | "00110000" | 2 |
| $S_3$ | "10011111" | 3 |
| $S_4$ | "00110000" | 2 |
| $S_5$ | "01011111" | 1 |
| $S_6$ | "00000000" | 0 |

Alternately, the combination of feedforward processor 40 and feedback processor 52 with computation ring 30 of neuron slice 14 may be viewed quantitatively through the following equations beginning with the feedforward computation as:

$$R_k^{(0)} = \sum_{j=1}^{p} (I_j \times W_j) \quad (2)$$

where:
$R_k^{(0)}$ is the contents of register 64 after the initial (0) dot product combination
k is neuron slice reference (i.e., k=1 for neuron slice 14, k=2 for neuron slice 16, etc.)
p is the number of elements in the dot product series for feedforward processor 40
$I_j$ is a digital input signal from input bus 12
$W_j$ is an addressable weight of weight memory 42.
The term $$\text{term} \sum_{j=1}^{p} (I_j \times W_j)$$

is provided by feedforward processor 40 performing a dot product combination of the digital input signals $I_1$–$I_8$ and the weights $W_1$–$I_8$ for the case of p=8 as per equation (1). After the initial dot product combination, the contents of register 54 is converted through lookup table 62, placed on computation ring 30 and shifted one position thereabout. The output signal of shift register 68 is multiplied by scale factor $S_m$ and added with the previous contents of register 54 as follows:

$$R_k^{(1)} = \sum_{m=1}^{q} (S_m \times \sigma(R_n^{(0)})) + R_k^{(0)} \quad (3)$$

where:
$R_k^{(1)}$ is the contents of register 54 after one rotation (six shifts)
$\sigma()$ is the sigmoid function
q is the number of neuron slices
n is m+k modulo q
$S_m$ is a scale factor for each respective feedforward outcome according to table 1.

More generally, the contents of register 54 after "i+1" rotations is:

$$R_k^{(i+1)} = \sum_{m=1}^{q} (S_m \times \sigma(R_n^{(i)})) + R_k^{(i)} \quad (4)$$

and the final output signal of multiplexer 64 after five rotations may be summarized as:

$$M_{64} = \sigma(R_k^{(5)}) = \sigma\left( \sum_{m=1}^{q} (S_m \times \sigma(R_n^{(4)})) + R_k^{(4)} \right) \quad (5)$$

It is understood that the preceding discussion of feedforward and feedback computations is given by way of example. The present invention is flexible enough to provide many other configurations such as conventional two-layer feedforward networks and various feature maps. Furthermore, the weights $W_i$ loaded into weight memories 42 of neuron slices 14–24 may be rapidly altered via input bus 46 from the external microprocessor and the processing order of digital input signals $I_i$ and weights $W_i$ may be controlled, whereby the neural interconnection and computation may be dynamically re-assigned for providing efficient use of the resources.

Figure 4:
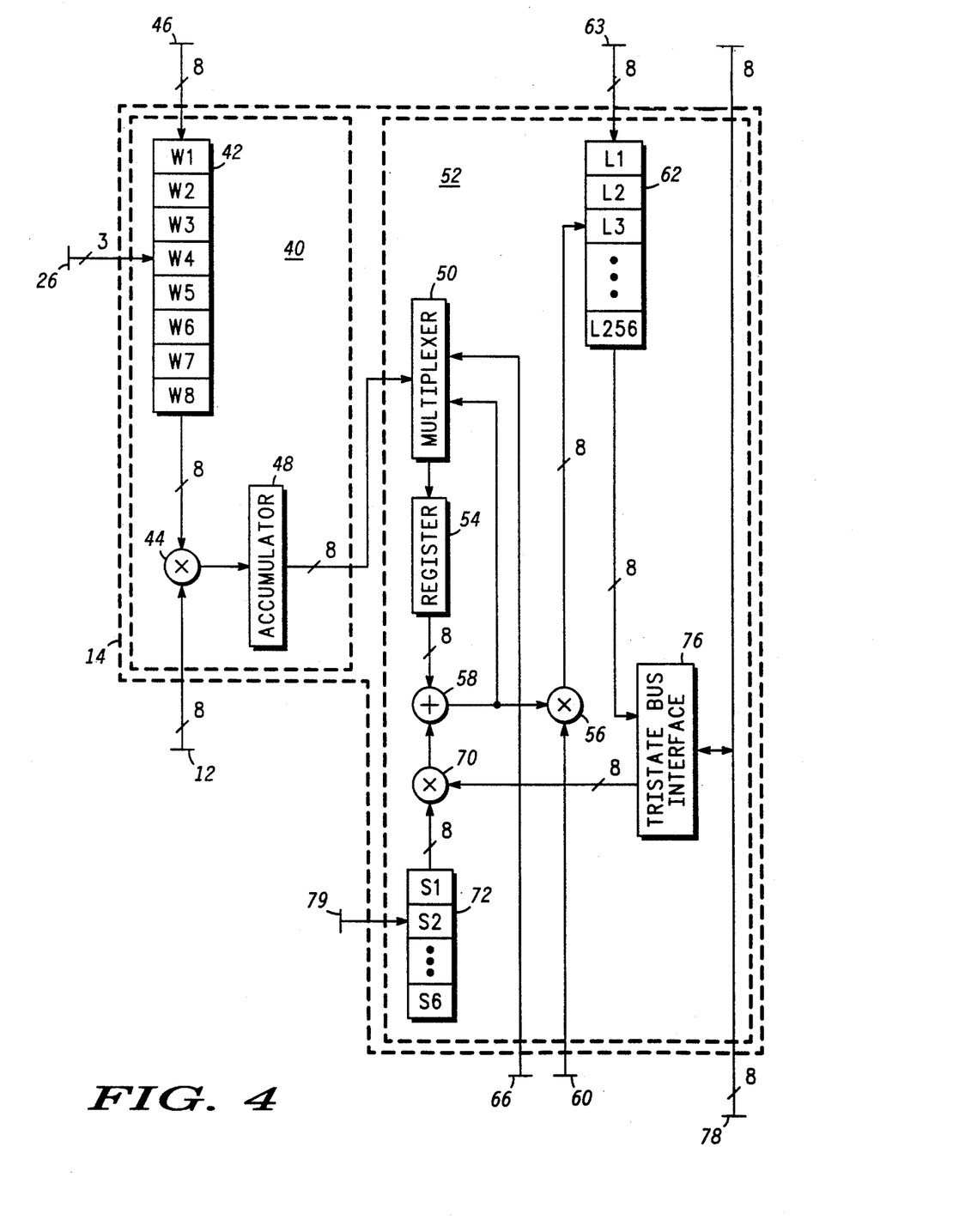
FIG. 4 is a simplified block diagram illustrating an alternate embodiment of a neuron slice with feedforward and feedback processors.

Another embodiment of feedback processor 52 is illustrated in FIG. 4. Feedforward processor 40 operates as described in the text associated with FIG. 2. The output signal of multiplexer 50 is stored in register 54 and applied at the first input of summer 58, the output of which is coupled to the second input of multiplexer 50 and to the first input of multiplier 56, while the output signal of the latter is applied at the address input of lookup table 62. Multiplexer 50 is responsive to the first control signal applied at control bus 66 for switching the input thereof to read from accumulator 48 at the occurrence of the first state of the first control signal and from the output of adder 58 at the occurrence of the second state of the first control signal. The second input of multiplier 56 is coupled for receiving a digital gain factor by way of input bus 60. The addressed value from lookup table 62 is applied through tristate bus interface 76 to data bus 78. Tristate bus interface 76 also removes data from data bus 78 for application to the first input of multiplier 70, while the output thereof is coupled to the second input of adder 58. The second input of multiplier 70 is coupled for receiving values from memory 72 according to the digital address signal applied at address input 79 from the microprocessor. The embodiment of FIG. 4 calls for separate memories like 72 for each neuron slice 14-24 as opposed to FIG. 2 wherein a common memory 72 simultaneous broadcast the digital scaling factors $S_1-S_6$ over digital input bus 28 in synchronous with the shifts of computation ring 30. By locating memory 72 locally, scale factors $S_1-S_6$ may differ for each neuron slice allowing flexible feedback computations. It is understood that the the configuration of adder 58 and multipliers 56 and 70 and the use of memory 72 with computation ring 30 or data bus 78 are each interchangeable between the embodiments of FIG. 2 and FIG. 4 with appropriate control sequencing logic from the microprocessor. The remaining components having a similar function are assigned the same reference numbers used in FIG. 2, and neuron slices 16-24 follow a similar construction as described for neuron slice 14.

For the feedforward operation, a digital signal "00000000" is read from memory 72 and applied at the second input of multiplier 70 for combination with the output signal of shift register 68 yielding a zero digital signal at the second input of adder 58 whereby nothing is added to the output signal of register 54. Thus, the eight most significant bits of accumulator 48 are loaded into register 54 via multiplexer 50, summed with the zero from adder 58 and scaled through multiplier 56 to generate an address word for lookup table 62. The contents of the addressed location in lookup table 62 is applied through tristate bus interface 76 to data bus 78 and becomes the 8-bit digital feedforward outcome $F_6$.

In contrast to the synchronized rotation of the feedforward outcomes $F_1-F_6$ via computation ring 30 as taught in FIG. 2, the operation of feedback processor 52 of FIG. 4 places one feedforward outcome at a time, say $F_6$ first, on data bus 78 where neuron slices 14-24 read the value through tristate bus interface 76 and address the appropriate slice factor $S_i$ from local memory 72 for multiplier 70. Since neuron slice 14 is not the same distance from the remaining neuron slices, the address signal applied at address bus 79 must be controlled for each memory like 72 to extract the appropriate scale factor. For example, neuron slices 16 and 24 should address scale factors $S_1$ and $S_5$, respectively, and neuron slices 18 and 22 should address scale factors $S_2$ and $S_4$, while neuron slices 20 and 14 addresses scale factors $S_3$ and $S_6$. Alternately, a common address signal may be broadcast to neuron slices 14-24 via address bus 79 while scale factors $S_1-S_6$ are arranged in each memory 72 to accomplish the aforedescribed combination. Neuron slices 14, 16, 18, 20, 22 and 24 each multiply feedforward outcome $F_6$ by digital scale factors $S_6$, $S_1$, $S_2$, $S_3$, $S_4$ and $S_5$, respectively, within multiplier 70. The output signal of multiplier 70 is added with the contents of register 54 via adder 58 and stored back into register 54 by way of multiplexer 50 overwriting the previous contents. The next feedforward outcome, say $F_5$, is placed on data bus 78 allowing neuron slices 14-24 to read it through tristate bus interfaces like 76 and address the appropriate scale factor $S_i$ from local memory 72. Now, neuron slices 14 and 18 should address scale factors $S_1$ and $S_5$, respectively, and neuron slices 20 and 24 should address scale factors $S_2$ and $S_4$, while neuron slices 22 and 16 addresses scale factors $S_3$ and $S_6$. Neuron slice 14 multiplies scale factor $S_1$ with feedforward outcome $F_5$, while neuron slice 16 multiplies scale factor $S_6$ by $F_5$, and neuron slice 18 combines scale factor $S_5$ with $F_6$, and so on. Again, the output signal of multiplier 70 is added with the contents of register 54 via adder 58 and stored back into register 54. The process continues in a like manner for feedforward outcomes $F_4-F_1$. In general, the local storage of digital scale factors $S_1-S_5$ in memory 72 allows for flexible feedback architectures to be implemented as each neuron slice may operate independent of the others with respect to scale factors $S_i$.

Figure 5:
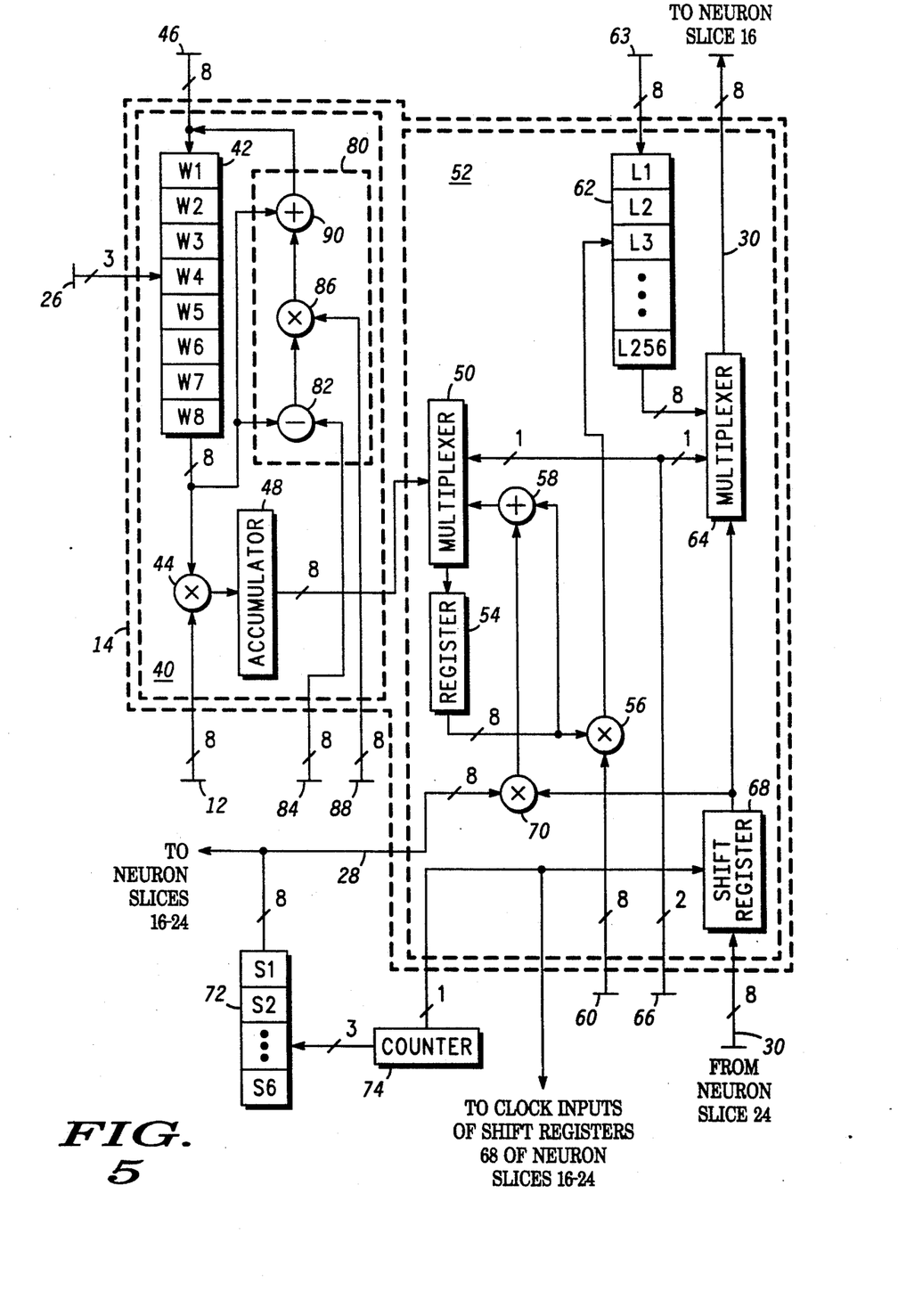
FIG. 5 is a block diagram illustrating a learning circuit for the feedforward processor of FIG. 2.

Another feature of feedforward processor 40 is shown in FIG. 5 as learning circuit 80 including subtracting circuit 82 having a first input coupled for receiving the weight $W_i$ provided at the output of weight memory 42 and a second input coupled for receiving a digital signal from input bus 84. The output signal of subtracting circuit 82 is applied at the first input of multiplier 86, while the second input of the same is coupled for receiving a digital signal via input bus 88. The output of multiplier 86 is coupled to the first input of adder 90 and the second input of adder 90 is coupled for receiving weight $W_i$ from weight memory 42. The output of adder 90 is coupled to the data input port of weight memory 42 at input bus 46 such that the contents thereof may be updated from the calculations of learning circuit 80. The circuit elements having a similar function are assigned the same reference numbers used in FIG. 2.

An important feature of neural network 10 is the ability to adjust the weights of the synapses for modifying its behavior according to changes in the external environment. Learning circuit 80 operates according to a predetermined learning rule as follows:

$$NW_i = OW_i + (PI_i - OW_i)PA \quad (6)$$

where:
  $NW_i$ is the new weight to be stored in weight memory 42
  PA is the plasticity-activity factor
  $OW_i$ is the old weight presently stored in weight memory 42
  $PI_i$ is the previous digital input signals $I_i$.

As the weights $W_i$ are addressed via the address word $A_i$ applied at address bus 26 for combination with present digital input signals $I_1-I_8$ via multiplier 44, each is also applied at the first input of subtracting circuit 82 and the second input of adder 90. The digital input signals $I_1-I_8$ are processed through feedforward processor 40 and feedback processor 52 and temporarily stored external to neural network 10 to become the previous digital input signals $PI_1-PI_8$ which are sequentially re-applied via input bus 84 to the second input of subtracting circuit 82 as per equation (6). The old weights $OW_i$ and previous digital input signals $PI_i$ are subtracted in sequence, for example, old weight $OW_1$ is subtracted from previous digital input signal $PI_1$ and old weight $OW_2$ is subtracted from previous digital input signal PI$_2$. The difference between the OW$_i$ and PI$_i$ is multiplied by plasticity-activity factor PA and the result is added to the old weight OW$_i$ from weight memory 42 for storage back in the same location.

The plasticity-activity factor PA is a function of plasticity and the current activities of neuron slices 14-24 and is computed by the external microprocessor from the output signals as extracted from computation ring 30. Typically, learning is accomplished slowly over several series of digital input signal I$_i$. Therefore, the plasticity-activity factor PA is made small such that the difference does not unduly influence the new weight NW$_i$. Indeed, learning circuit 80 may be completely disabled by applying a digital zero to input bus 88. For example, if the result of the previous series computation shows low activity (low values for the final feedforward outcomes from multiplexers 64 of neuron slices 14-24), the incoming data may not be worthy of learning as it does not match the knowledge base (weights) of the synapses. Thus with low activity, the plasticity-activity factor PA may be set to a digital zero. The output signal of subtracting circuit 82 is thus multiplied by zero via multiplier 86 and nothing is added to the old weight. Conversely, if the result of the previous series computation shows high activity, then learning would typically proceed at the rate determined by the plasticity-activity factor such as the digital equivalent of $\frac{1}{4}$, $\frac{1}{8}$, 1/16, etc. It is understood that digital circuits may divide by 4, 8 and 16 by setting the control signals to a multiplexer circuit. The difference of the old weight OW$_i$ and the previous series digital input signals PI$_i$ multiplied by the plasticity-activity factor PA is added with the old weight OW$_i$ and stored back in addressed location of weight memory 42. Notably, learning may operate continuously at the same speed as feedforward processing 40, thus providing real-time updates of weight memory 42 in response to changes in the external environment. As an additional benefit, if weight memory 42 is implemented with DRAM, learning circuit 80 may also refresh the DRAM since each memory element is accessed cyclically.

Hence, what has been provided is a novel artificial neural network using a digital architecture having feedforward and feedback processors and further including a digital computation ring or data bus to handle complex neural feedback arrangements. The feedforward and feedback processors are configurable to perform many different neural computations, while a learning circuit is provided to update the weights of the feedforward processor to reflect changes in the environment in a real-time manner.

We claim:

1. A neural network, comprising:
   a first digital input bus coupled for receiving a first digital input signal;
   a digital address bus coupled for receiving a digital address signal;
   first means for storing a plurality of digital weighting elements, said first means being coupled to said digital address bus for addressing one of said plurality of digital weighting elements according to said digital address signal and loading said one of said plurality of digital weighting elements onto an output port, said first means including an input port for receiving data for storage as one of said plurality of digital weighting elements;
   second means coupled for receiving said first digital input signal and said one of said plurality of digital weighting elements for providing an output signal as the product of said first digital input signal and said one of said plurality of digital weighting elements;
   third means coupled for receiving said output signal of said second means and accumulating the value thereof; and
   fourth means responsive to said plurality of digital weighting elements and second and third digital input signals for altering the values of said plurality of digital weighting elements stored in said first means, said fourth means including,
   (a) a subtracting circuit having first and second inputs and having an output, said first input being coupled to said output port of said first means for receiving ones of said plurality of digital weighting elements, said second input being coupled for receiving said second digital input signal representative of a previous series of said first digital input signals, said output providing a difference signal from said one of said plurality of digital weighting elements and said second digital input signal,
   (b) a first multiplication circuit having first and second inputs and having an output, said first input being coupled to said output of said subtracting circuit, said second input being coupled for receiving a third digital input signal for weighting said difference signal, and
   (c) a summing circuit having first and second inputs and having an output, said first input being coupled to said output of said first multiplication circuit, said second input being coupled to said output port of said first means, said output being coupled to said input port of said first means.

2. The neural network of claim 1 wherein said digital address signal and said first digital input signal change value such that ones of said plurality of digital weighting elements are respectively multiplied by said first digital input signal for providing a plurality of output signals of said second means over time which are accumulated in said third means.

3. The neural network of claim 2 wherein said first means includes a plurality of digital memory locations addressable by said digital address signal and having a common output coupled to said output port of said first means.

4. The neural network of claim 3 wherein said second means includes a second multiplication circuit having first and second inputs and an output, said first input being coupled to said digital input bus, said second input being coupled to said output port of said first means for receiving said one of said plurality of digital weighting elements, said output providing said output signal of said second means as the product of said first digital input signal and said one of said plurality of digital weighting elements.

5. The neural network of claim 4 wherein said third means includes a digital accumulating circuit having an input coupled to said output of said second multiplication circuit and having an output for providing an output signal as the sum total of said plurality of output signals of said second means.

6. In a neural network a plurality of digital processing elements, each of said plurality of digital processing elements being coupled to a first digital input bus for receiving a first digital input signal and to a digital address bus for receiving a digital address signal and providing an output signal at an output, one of said plurality of digital processing elements comprising:

first means for storing a plurality of digital weighting elements, said first means being coupled to the digital address bus for addressing one of said plurality of digital weighting elements according to the digital address signal and loading said one of said plurality of digital weighting elements onto an output port;

second means coupled for receiving the first digital input signal and said one of said plurality of digital weighting elements for providing an output signal as the product of the first digital input signal and said one of said plurality of digital weighting elements;

third means coupled for receiving said output signal of said second means and providing an output signal at an output as the accumulation thereof; and fourth means responsive to said output signal of said third means and the output signals of ones of said plurality of digital processing elements for accumulating the values thereof and providing said output signal of said one of said plurality of processing elements, said fourth means including, (a) a first multiplexer circuit responsive to first and second states of a first control signal for selecting between said output signal of said third means applied at a first input and a digital signal applied at a second input, respectively, for providing an output signal, (b) a register circuit having an input coupled for receiving said output signal of said first multiplexer circuit and having an output, (c) a first multiplier circuit having first and second inputs and an output, said first input being coupled for receiving a second digital input signal, said second input being coupled for receiving one of the output signals of said plurality of digital processing elements, said output providing an output signal as the product thereof, and (d) an adder circuit having first and second inputs and an output, said first input being coupled to said output of said register circuit, said second input being coupled for receiving said output signal of said first multiplier circuit, said output providing said digital signal applied at said second input of said first multiplexer circuit as the summation thereof.

* * * * *